United States Patent
Komatsu et al.

(10) Patent No.: US 8,181,325 B2
(45) Date of Patent: May 22, 2012

(54) SOFT MEMBER MOUNTING METHOD AND APPARATUS

(75) Inventors: Saeko Komatsu, Tochigi (JP);
Toshiyuki Kondo, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 1057 days.

(21) Appl. No.: 12/092,104

(22) PCT Filed: Nov. 16, 2005

(86) PCT No.: PCT/JP2005/021394
§ 371 (c)(1),
(2), (4) Date: Apr. 30, 2008

(87) PCT Pub. No.: WO2007/057978
PCT Pub. Date: May 24, 2007

(65) Prior Publication Data
US 2009/0260211 A1 Oct. 22, 2009

(51) Int. Cl.
*B23P 11/02* (2006.01)

(52) U.S. Cl. . 29/451; 29/243.5; 29/243.58; 29/243.526; 29/437; 29/235; 29/435

(58) Field of Classification Search ............. 29/451, 29/435, 243.5, 243.58, 243.526, 437, 235
See application file for complete search history.

(56) References Cited

U.S. PATENT DOCUMENTS

| | | | | |
|---|---|---|---|---|
| 4,715,110 A | * | 12/1987 | St. Angelo et al. | 29/701 |
| 4,760,636 A | * | 8/1988 | St. Angelo et al. | 29/701 |
| 4,780,943 A | * | 11/1988 | St. Angelo et al. | 29/235 |
| 4,843,701 A | * | 7/1989 | St. Angelo et al. | 29/235 |
| 4,852,240 A | * | 8/1989 | St. Angelo et al. | 29/559 |
| 5,018,264 A | * | 5/1991 | Kautt | 29/564.8 |
| 5,031,293 A | * | 7/1991 | Goedderz et al. | 29/235 |
| 5,155,890 A | * | 10/1992 | Goedderz | 29/235 |
| 5,199,154 A | * | 4/1993 | Mesnel et al. | 29/451 |
| 5,201,106 A | * | 4/1993 | Moore et al. | 29/407.05 |
| 5,533,250 A | * | 7/1996 | Ladouceur | 29/702 |
| 5,875,670 A | * | 3/1999 | Stojkovski et al. | 72/211 |

FOREIGN PATENT DOCUMENTS

| | | |
|---|---|---|
| JP | 05-200638 A | 8/1993 |
| JP | 5-65298 B2 | 9/1993 |
| JP | 08-155843 A | 6/1996 |
| JP | 08-174353 A | 7/1996 |
| JP | 10-166280 A | 6/1998 |

* cited by examiner

*Primary Examiner* — David Bryant
*Assistant Examiner* — Bayan Salone
(74) *Attorney, Agent, or Firm* — Arent Fox, LLP (57) ABSTRACT

A method for mounting a soft member on a longitudinal member by pressing the soft member against the longitudinal member by a roller. The roller is rotated using a servomotor so that the peripheral speed (V2) of the pressing surface of the roller, which forms the outer peripheral surface of the roller, is equal to a transfer speed (V1) at which the roller is transferred along the longitudinal member or the peripheral speed is larger by 10% max. than the transfer speed (V1) partly in a roller transfer route. The soft member is pulled back in the opposite direction of the roller transfer direction by the rotating force of the roller to prevent the soft member from being loosened.

2 Claims, 7 Drawing Sheets

FIG. 8A
(COMPARATIVE EXAMPLE)

FIG. 8B
(EXAMPLE)

FIG.10
(PRIOR ART)

SOFT MEMBER MOUNTING METHOD AND APPARATUS

TECHNICAL FIELD

The present invention relates to an improvement in a method and apparatus for mounting a soft member.

BACKGROUND ART

Figure 10:
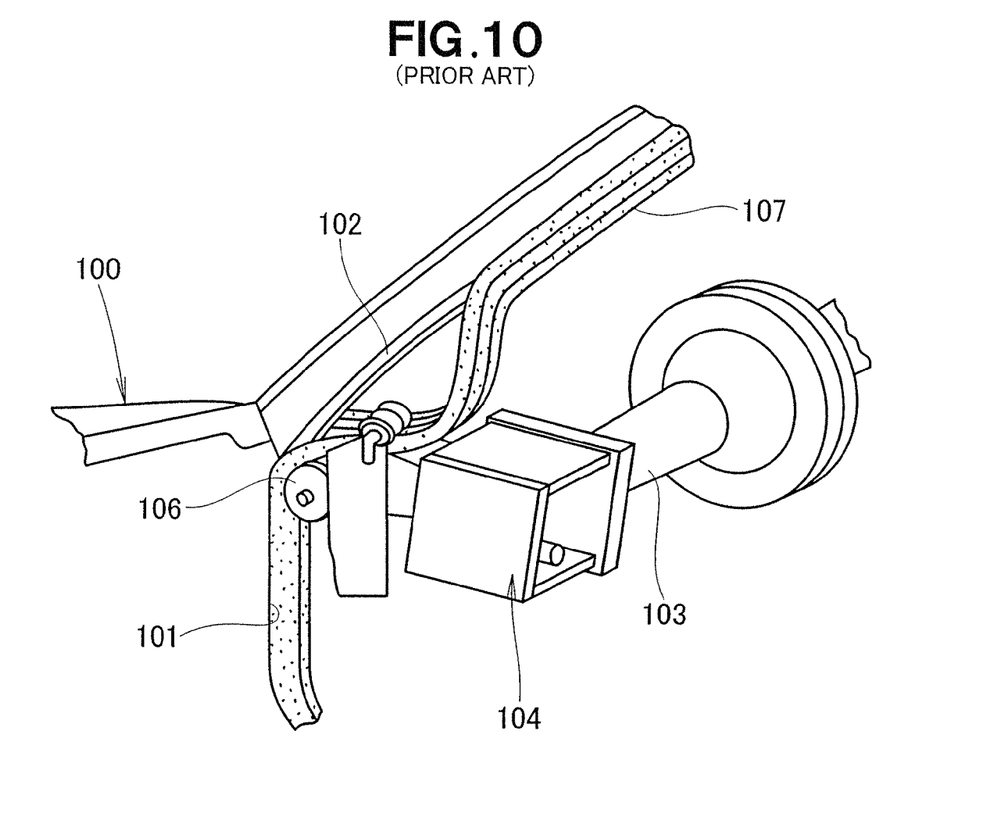
FIG. 10 is a perspective view of a prior art apparatus for mounting a soft member.

Soft-member-mounting methods or apparatuses are well known, as disclosed in JP-B-5-65298 showing use of robots to mount a soft member or a weather stripping in a vehicle door opening. With reference to FIG. 10 hereof, discussion will be made as to mounting such a weather stripping in the vehicle door opening.

As shown in FIG. 10, a vehicle body 100 includes a flange 102 provided in an opening 101 in which a vehicle door is to be installed. An arm tooling device 104 is mounted to a wrist 103 of a robot. The arm tooling device 104 includes a pressure roller 106 for pressing a weather stripping 107 against the flange 102 to fit the weather stripping 107 in the flange 102. The pressure roller 106 is driven by a motor and has a rotational speed varied by a clutch connecting or disconnecting a drive between the pressure roller 106 and the motor.

Where the pressure roller 106 mounts the weather stripping 107 to a straight section of the door opening 101, the clutch disconnects the drive between the pressure roller 106 and the motor such that the arm tooling device 104 moves allowing the pressure roller 106 to free wheel on the straight section of the opening 101. Where the weather stripping 107 is mounted to a corner of the door opening 101, the clutch connects the drive between the pressure roller 106 and the motor to rotate the pressure roller on the corner at a higher rotational speed than on the straight section such that slacks in the weather stripping 107 are taken up.

As the pressure roller 106 free wheels on the straight section of the door opening 101, the weather stripping 107 can be pushed in a direction of movement of the pressure roller 106, slackening in front of the pressure roller 106.

Large slacks in the weather stripping 107 can not be taken up even if the rotational speed of the pressure roller 106 is made high when the roller arrives at the corner of the door opening 101. As a result, the weather stripping 107 can wrinkle or be lifted up. The wrinkled or lifted weather stripping 107 mounted to the door opening 101 is poor in quality and thus should be repaired or detached from and again mounted to the door opening 101, which leads to decrease in productivity of vehicles.

There is a need to enhance quality of the soft member mounted to the vehicle door openings for improving productivity of vehicles.

DISCLOSURE OF THE INVENTION

According to a first aspect of the invention, there is provided a method for mounting a soft member on an elongated member by fitting the soft member into the elongated member, the elongated member having a substantially U-shaped cross-section, the soft member having an elongated configuration, the method comprising the steps of: temporarily attaching the soft member to the elongated member; and rotating a roller while moving the roller on a route provided along the elongated member with the roller pressing the soft member, such that a pressed surface of the roller pressed against the soft member has a peripheral speed either equal to a speed of the movement of the roller or higher than the speed of the movement of the roller by a maximum of 10% of the speed of the movement of the roller when the roller reaches at least one part of the route, wherein a pressing force of the roller exerted on the soft member is always constant as the roller presses the soft member.

The roller rotates such that the peripheral speed of the pressed surface of the roller is either equal to the speed of the movement of the roller or higher than the speed of the movement of the roller by the maximum of 10% of the speed of the movement of the roller when the roller reaches at least one part of the route. This rotation of the roller pulls the soft member back in a direction opposite to the direction of the movement of the roller.

Since the pressing force of the roller exerted on the soft member is always constant as the roller presses the soft member, the soft member can be entirely and uniformly mounted on the elongated member of substantially U-shaped cross-section. In other words, it becomes possible to prevent the soft member from slackening or stretching in the direction of the movement of the roller when the soft member is fitted in the elongated member. The exertion of the constant pressing force of the roller on the soft member enables the soft member to be uniformly fitted in the elongated member, which improves quality of the soft member fitted in the elongated member. The soft member of improved quality need not be repaired nor detached from and again mounted to the elongated member, which leads to improved productivity of vehicles.

According to a second aspect of the present invention, there is provided an apparatus for mounting a soft member on an elongated member by fitting the soft member into the elongated member, the elongated member having a substantially U-shaped cross-section, the soft member having an elongated configuration, the apparatus comprising: a roller rotated by an actuator; moving means for moving the roller along the elongated member with the roller pressing the soft member against the elongated member; a force sensor disposed between the roller and the moving means for detecting a reaction force applied to the roller; and a control unit for controlling the roller on the basis of the reaction force detected by the force sensor, such that a pressing force of the roller to press the soft member is constant while a pressed surface of the roller pressed against the soft member has a peripheral speed either equal to a speed of the movement of the roller or higher than the speed of the movement of the roller by a maximum of 10% of the speed of the movement of the roller.

The force sensor detects the reaction force applied to the roller. Based on this detected reaction force, the control unit drives the moving unit to control the position of the roller relative to the soft member such that the pressing force of the roller exerted on the soft member is constant. The control unit controls the roller such that as the roller moves along the elongated member with the constant pressing force of the roller exerted on the soft member, the peripheral speed of the pressed surface of the roller is either equal to the speed of the movement of the roller or higher than the speed of the movement of the roller by the maximum of 10% of the speed of the movement of the roller.

In short, the force sensor detects the reaction force applied to the roller pressing the soft member, in order that the control unit keeps the roller pressing force constant. With the constant pressing force exerted on the soft member, the soft member can be uniformly fitted in the elongated member.

Further, the control unit controls the roller such that the peripheral speed of the pressed surface of the roller is either equal to the speed of the roller moved by the moving unit or higher than the speed of the roller by the maximum of 10% of the speed of the roller. This control of the roller prevents the soft member from slackening or stretching in the direction of the movement of the roller when the soft member is fitted in the elongated member. As a result, the soft member mounted on the elongated member provides improved quality. The soft member of improved quality need not be repaired nor detached from and again mounted on the elongated member, which provides improved productivity of vehicles.

BRIEF DESCRIPTION OF THE DRAWINGS

FIG. 8A is a view showing a comparative example of a principle on the basis of which a weatherstrip is mounted on a sash while

FIG. 9A is a view showing a pressing force the roller exerts on a weatherstrip where a sash is not in a slanting position while

BEST MODE FOR CARRYING OUT THE INVENTION

Figure 1:
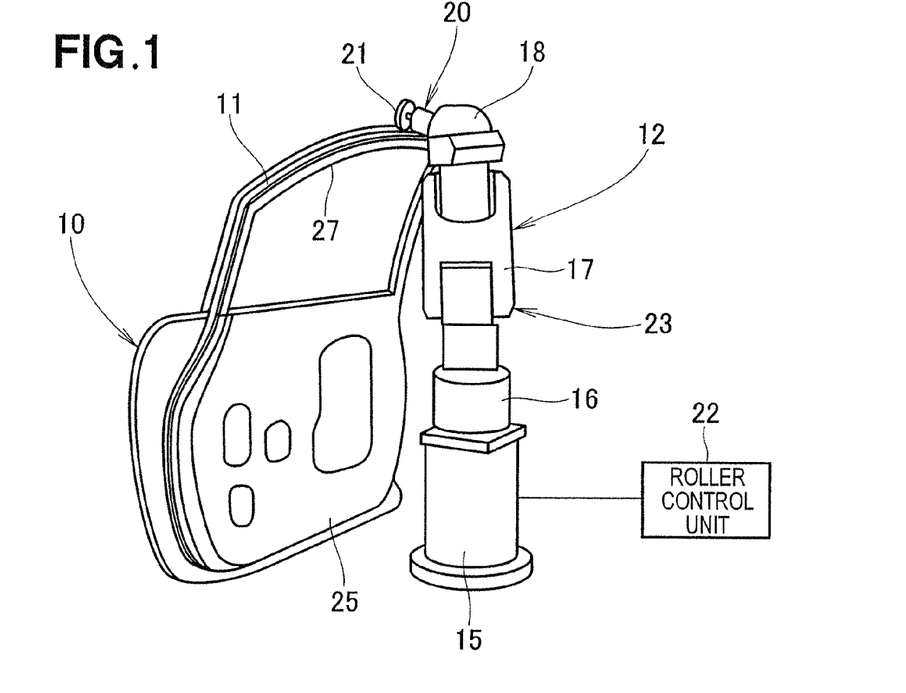
FIG. 1 is a perspective view showing a vehicle door and a weatherstrip-mounting apparatus according to the present invention.

Referring to FIG. 1, there is shown a weatherstrip-mounting apparatus 12 for mounting a weatherstrip (a soft member) 11 on an outer peripheral edge of a vehicle door 10. The apparatus 12 is a robot including a base 15 attached to a floor, a rotatable base 16 rotatably mounted on the base 15, a first arm 17 attached to the base 16, a second arm 18 attached to the first arm 17, a roller unit 20 attached to a distal end portion of the second arm 18, and a roller control unit 22.

The roller unit 20 includes a roller 21. The roller control unit 22 controls both a pressing force of the roller 21 exerted on the weatherstrip 11 and a peripheral speed of a pressed surface 21a (FIG. 3) of the roller 21 pressed against the weatherstrip 11 as the roller 21 presses the weatherstrip 11 so as to mount the weatherstrip 11 to the vehicle door 10. The rotatable base 16, the first arm 17, the second arm 18 and a pivotal base 28 (FIG. 3) jointly constitute a moving unit 23 for moving the roller 21.

Figure 2:
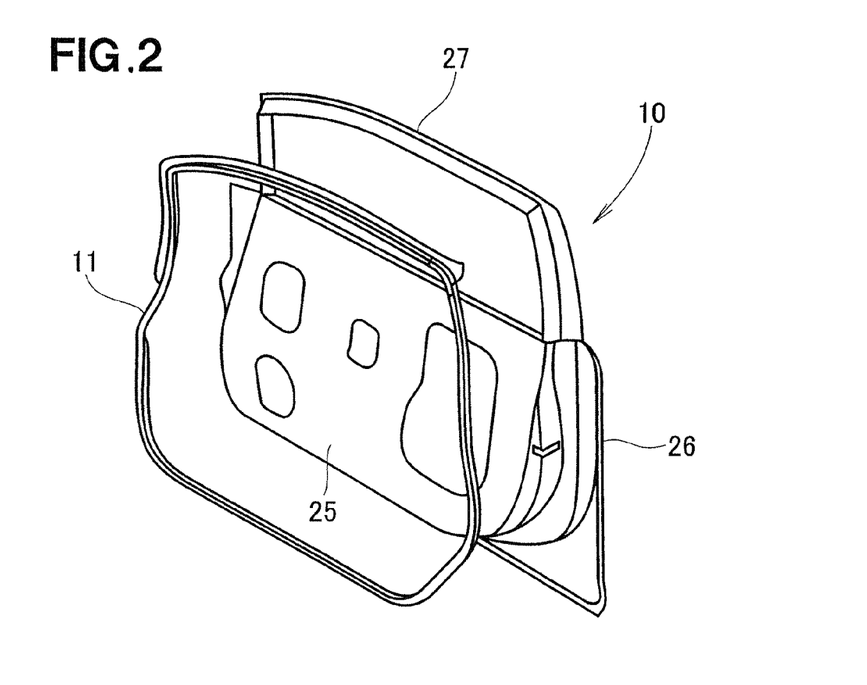
FIG. 2 is a perspective view of the vehicle door shown in FIG. 1.

FIG. 2 shows that the vehicle door 10 includes an inner panel 25 located on a passenger-compartment-side, an outer panel 26 attached to an exterior side of the inner panel 25, and a sash 27 attached to tops of the panels 25, 26. The weatherstrip 11 is mounted on outer peripheral edges of the inner panel 11 and the sash 27.

Figure 3:
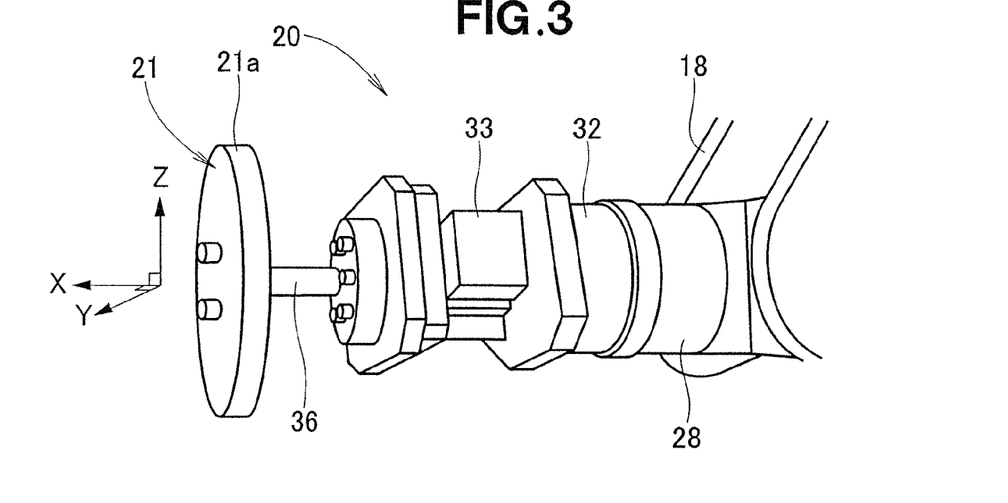
FIG. 3 is an enlarged perspective view of a roller unit shown in FIG. 1.

As shown in FIG. 3, the roller unit 20 includes a force sensor 32 connected to the pivotal base 28 swingably supported by the second arm 18, a servomotor 33 attached to a distal end of the force sensor 32, and the roller 21 driven by the servomotor 33. The pressed surface 21a of the roller 21 defines an outer peripheral surface of the roller 21. The roller 21 is attached to a distal end portion of a roller-supporting shaft 36 attached to a rotational shaft of the servomotor 33.

The force sensor 32 detects a force directed in a direction along each of three axes (an X axis, a Y axis and a Z axis) perpendicular to each other. It is to be noted that the X axis extends in a direction of extension of the rotational shaft of the servomotor 33 or the roller-supporting shaft 36, the Z axis extends vertically, and the Y axis extends perpendicularly to the X axis and the Z axis. The force sensor 32 also detects torque about each of the X axis, the Y axis and the Z axis. The force sensor 32 outputs the detected force as a force signal.

The servomotor 33 has a speed controlled by the roller control unit 22. More specifically, the speed of the servomotor 33 is controlled such that as the roller 21 moves along the edge of the vehicle door 10, a peripheral speed of the pressed surface 21a of the roller 21 is either equal to a speed of the movement of the roller 21 (the speed of the movement of the roller 21 is generated by the moving unit 23) or higher than the speed of the movement of the roller 12 by a maximum of 10% of the speed of the movement of the roller 21.

Figure 4:
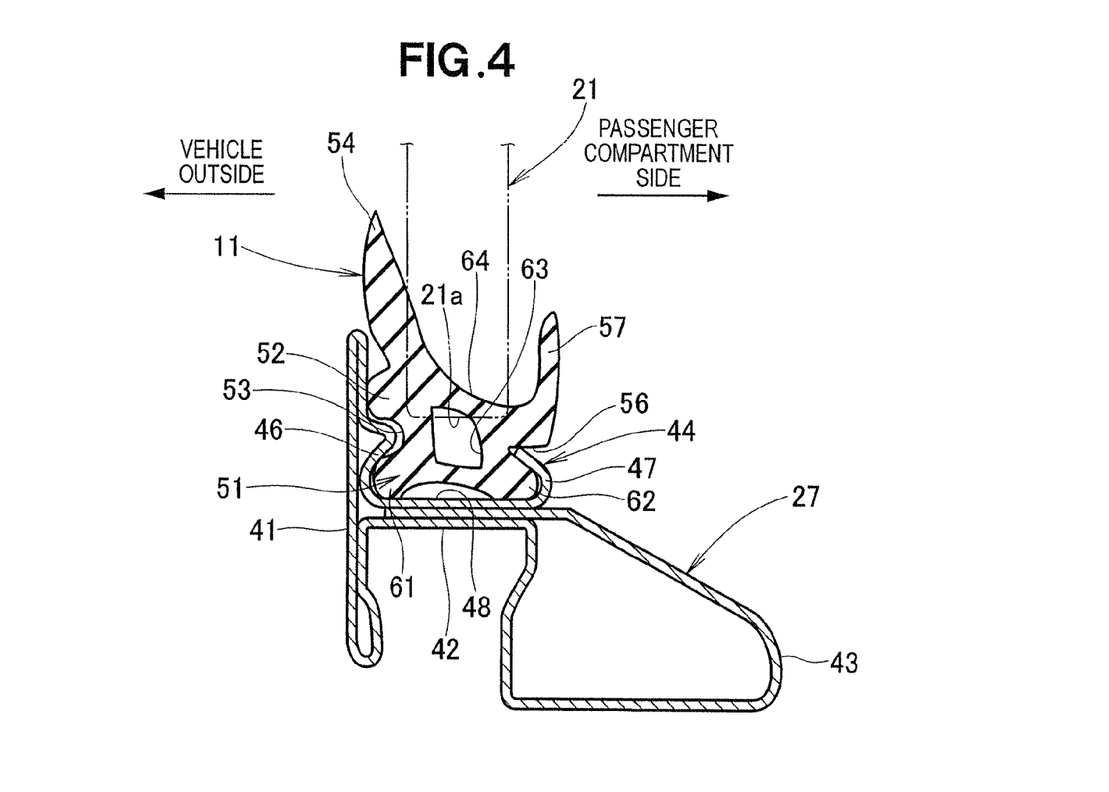
FIG. 4 is a view showing in cross-section a sash of the vehicle door and a weatherstrip mounted on the sash.

FIG. 4 shows the weatherstrip 11 mounted on the vehicle door. The sash 27 includes a wall portion 41 located on a vehicle outside, an extension portion 42 horizontally extending from the wall portion 41 towards the passenger-compartment-side, a projection portion 43 formed at an end portion of the extension portion 42 and located on the passenger-compartment-side, and a U-shaped cross-sectional portion 44 formed on a top of the extension portion 42. The U-shaped cross-sectional portion 44 includes a first projection portion 46, a second projection portion 47, and a bottom portion 48.

The weatherstrip 11 includes a fitted portion 51 fitted in the U-shaped cross-sectional portion 44 of the sash 27. The weatherstrip 11 also includes an outward projecting portion 52, a first recess portion 53 and a first lip portion 54 all of which are located on a side of the fitted portion 51 facing towards the vehicle outside. The weatherstrip 11 further includes a second recess portion 56 and a second lip portion 57 that are located on a side of the fitted portion 51 facing towards the passenger-compartment-side. The fitted portion 51 has first and second leg portions 61, 62. Reference numeral 63 designates a hollow portion 63. Between the first lip portion 54 and the second lip portion 57 is located a recess 64.

In mounting the weatherstrip 11 on the sash 27, the roller 21 presses the weatherstrip 11 with the pressed surface 21 pressed against the recess 64 of the weatherstrip 11.

Figure 5:
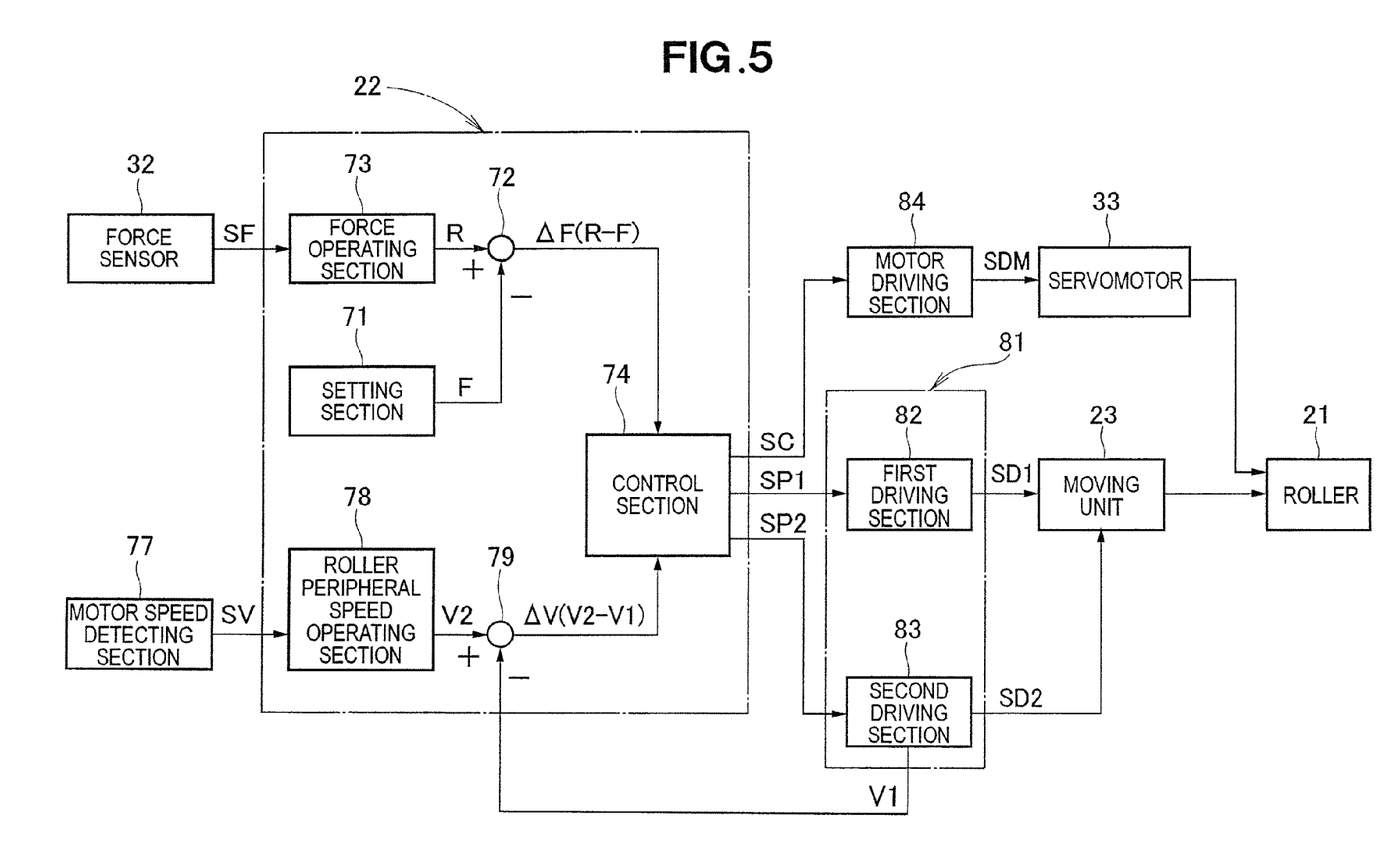
FIG. 5 is an electrical block diagram of a roller control unit of FIG. 1.

FIG. 5 shows an electrical block diagram of the roller control unit 22. The roller control unit 22 includes a setting section 71, a subtracter 72, a force operating section 73, a control section 74, a roller peripheral speed operating section 78 and a subtracter 79.

The setting section 71 sets a target value F of a pressing force of the roller 21 pressing the weatherstrip 11. The force operating section 73 calculates a reaction force R applied to the roller 21 on the basis of a force signal SF output from the force sensor 32. The subtracter 72 calculates a difference ΔF (R−F) between the reaction force R output from the force operating section 73 and the target value F output from the setting section 71. The roller peripheral speed operating section 78 calculates a peripheral speed V2 of the pressed surface 21a of the roller 21 on the basis of a speed signal SV output from a motor speed detecting section 77 provided for detecting a speed of the servomotor 33. The subtracter 79 compares the peripheral speed V2 calculated by the section 78 with a speed V1 of movement of the roller 21 along the sash 27 to thereby calculate a difference ΔV (V2−V1) between the peripheral speed V2 and the speed V1. As will be explained later, the speed V1 is output from a second driving section 83. The control section 74 outputs a motor speed controlling signal SC, a first position controlling signal SP1, and a second position controlling signal SP2 on the basis of the difference ΔF output from the subtracter 72 and the difference ΔV output from the subtracter 79.

Discussion will be made as to a manner of mounting the weatherstrip 11 with reference to FIG. 6 to FIG. 9B.

Figure 6:
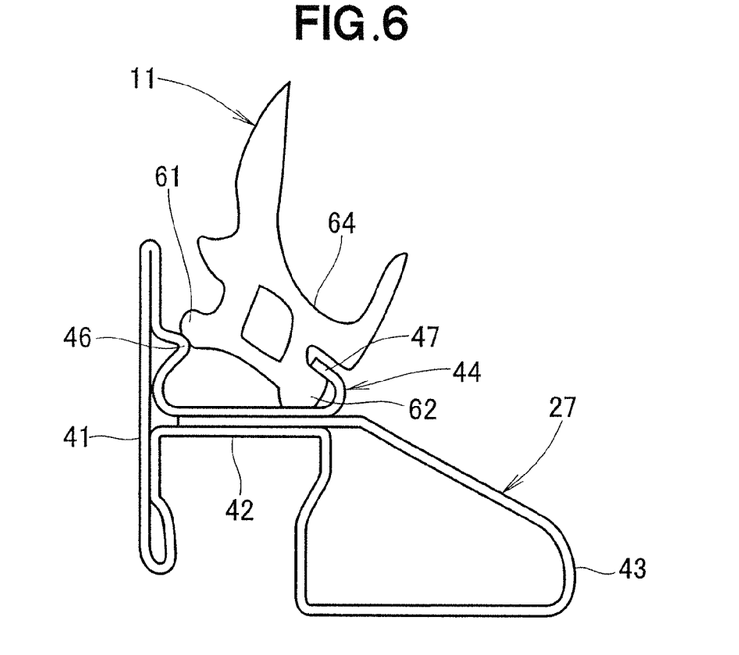
FIG. 6 is a view showing the weatherstrip temporarily attached to the sash.

Initially, as shown in FIG. 6, the weatherstrip 11 is temporarily attached to the sash 27 with the second leg portion 62 engaged with the second projection portion 47 of the U-shaped cross-sectional portion 44 of the sash 27. At this time, the first leg portion 61 of the weatherstrip 11 is put on the first projection portion 46 of the sash 27.

Figure 7:
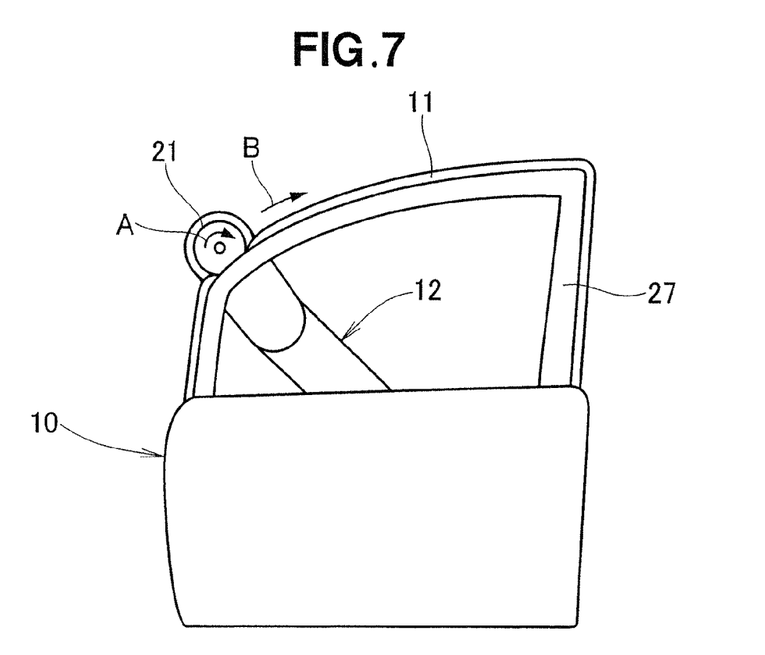
FIG. 7 is a view showing that a roller moves along the sash rotating so as to mount the weatherstrip on the sash.

Next, as shown in FIG. 7, the roller 21 is rotated by the servomotor in a direction of an arrow A while moving on a route provided along the sash 27 in a direction of an arrow B. At this time, the roller 21 presses the weatherstrip 11 temporarily attached to the sash 27, thereby mounting the weatherstrip 11 on the sash 27.

A principle on the basis of which the roller 21 mounts the weatherstrip 11 on the sash 27 will be discussed in comparison with a comparative example shown in FIG. 8A.

Figure 8A:
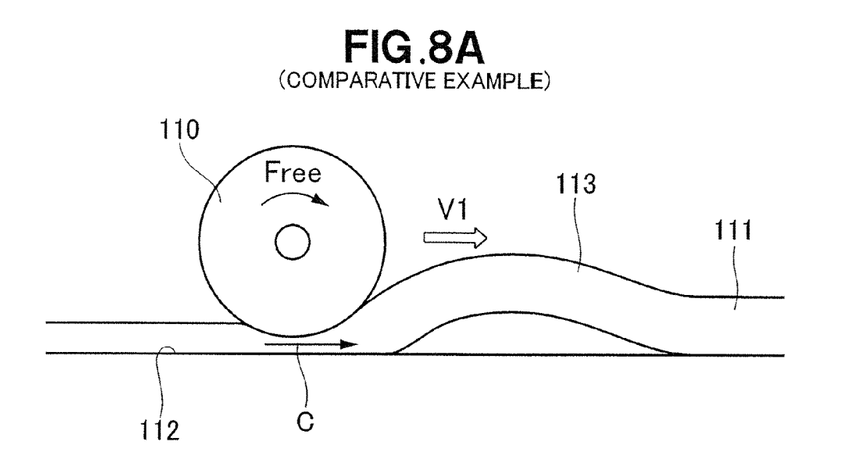

Referring to FIG. 8A, in pressing a weatherstrip 111 to mount the same on a sash 112, a roller 110 moves at a speed V1 freely rotating without being fed with power from power source. The movement of the roller 110 at the speed V1 pushes the weatherstrip 111 in a direction of the movement of the roller 110, as shown by an arrow C. As a result, a slack part 113 lifted off the sash 112 is formed in the weatherstrip 111 in front of the roller 110.

Figure 8B:
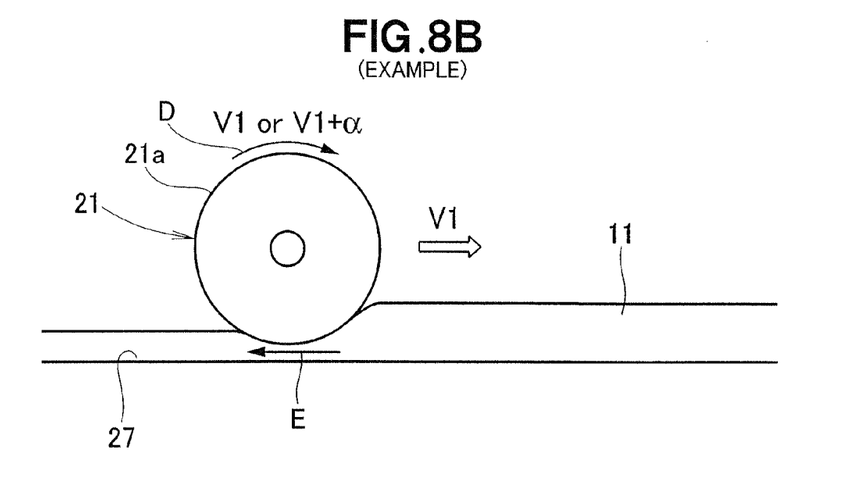
FIG. 8B is a view showing a preferred embodiment of a principle on the basis of which a weatherstrip is mounted on a sash.

In contrast, according to the preferred embodiment of the present invention, as shown in FIG. 8B, the roller 21 rotates in a direction shown by an arrow D such that a peripheral speed of a roller outer peripheral surface, i.e., the pressed surface 21a pressed against the weatherstrip 111 is equal to the speed V1 of the roller 21. Alternatively, when the roller 21 reaches at least one part of the route provided along the sash 27, the roller 21 rotates in the direction of the arrow D at a maximum of speed V1+α (for example, α=0.1 V1). Otherwise, the roller 21 rotates in the direction of the arrow D at the maximum of the speed V1+α (for example, α=0.1 V1) temporarily during the movement of the roller 21 on the route.

The rotation of the roller in the manner shown in FIG. 8B causes the weatherstrip 11 to move back in a direction shown by an arrow E. As a result, the weatherstrip can be uniformly mounted on the sash 27 without slackening in the direction of the movement of the roller 21.

Figure 9A:
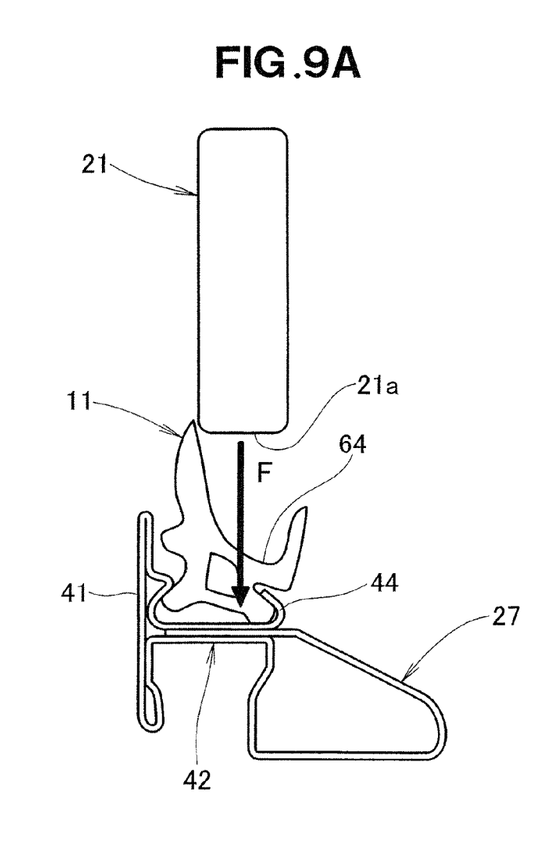
Figure 9B:
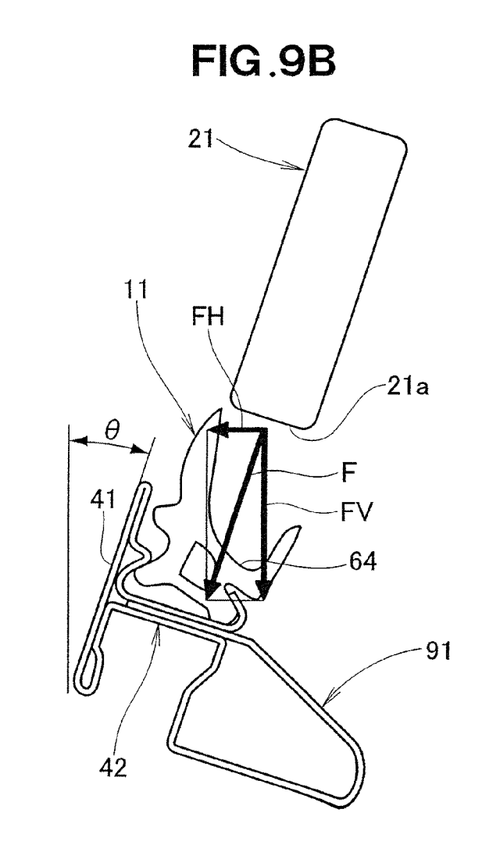
FIG. 9B is a view showing a pressing force the roller exerts on the weatherstrip where the sash is in the slanting position.

FIG. 9A and FIG. 9B illustrate the weatherstrip 11 pressed against the sash 27.

Where the weatherstrip 11 is mounted on the sash 27 in FIG. 9A, the roller 21 is pressed against the recess 64 of the weatherstrip 11 in a direction perpendicular to the extension portion 42 with a pressing force F exerted on the recess 64. Where a sash 91 (identical in structure to the sash 27) slants through an angle θ relative to the sash 27 of FIG. 9A, as shown in FIG. 9B, the roller 21 is pressed against the recess 64 in the direction perpendicular to the extension portion 42 such that horizontal and vertical components FH, FV of a pressing force F are exerted on the recess 64.

Discussion will be made as to a manner in which the roller control unit 22 of FIG. 5 operates when the weatherstrip 11 is mounted on the sash 27.

Referring to FIG. 5, so as to set the difference ΔF to zero, the control section 74 outputs the first position controlling signal SP1 to a robot-driving section 81 of the weatherstrip-mounting apparatus 12, more specifically, to a first driving section 82 from which a first driving signal SD1 is output to the moving unit 23 for driving the moving unit 23 to move the roller unit 20 closely to or away from the sash 27 such that the roller 21 presses the weatherstrip 11 with the pressing force of the target value F exerted on the weatherstrip 11.

The control section 74 outputs the second position controlling signal SP2 on the basis of which the second driving section 83 outputs a second driving signal SD2. Based on this signal SD2, the moving unit 23 moves the roller 21 along the sash 27 at a predetermined speed V1. The second driving section 83 gives the subtracter 79 such a speed V1.

Further, so as to set the difference ΔV to zero, the control section 74 outputs the motor speed controlling signal SC to a motor driving section 84 from which a motor driving signal SDM is output to the servomotor 33 to control a speed of the servomotor 33. The peripheral speed V2 of the roller 21 is always equal to the speed V1 as the roller moves on the route provided along the sash 27. Alternatively, the speed V2 becomes higher than the speed V1 (for example, by a maximum of 10% of the speed V1) at a time the roller 21 reaches at least one part of the route provided along the sash 27, and the speed V1 is equal to the speed V1 as the roller 21 moves on the rest of the route.

As described above, according to the first aspect of the present invention, there is provided a method for mounting the weatherstrip 11 (an elongated soft member) on the substantially-U-shaped-cross-sectional sash 27 (an elongated member) by fitting the weatherstrip 11 into the sash 27. The method comprises the steps of: temporarily attaching the weatherstrip 11 to the sash 27; and rotating the roller 21 while moving the roller 21 on the route provided along the sash 27 with the roller 21 pressing the weatherstrip 11, such that the pressed surface 21a of the roller 21 has the peripheral speed V2 (FIG. 5) controlled by the roller control unit 22 to be always equal to the speed V1 of the movement of the roller 21 or such that the peripheral speed V2 is higher than the speed V1 by α (concretely 10% of the speed V1) at a time the roller 21 reaches at least one part of the route and the speed V2 is equal to the speed V1 as the roller 21 moves on the rest of the route, wherein the pressing force F of the roller exerted on the weatherstrip 11 is controlled by the roller control unit 22 to be always constant as the roller 21 presses the weatherstrip 11.

According to the second aspect of the present invention, there is provided the weatherstrip-mounting apparatus 12 for mounting the elongated weatherstrip 11 on the substantially-U-shaped-cross-sectional sash 27 by fitting the weatherstrip 11 into the sash 27, as shown in FIG. 1, FIG. 3 and FIG. 4. The apparatus 12 comprises: the roller 21 rotated by the servomotor (an actuator) 33; moving unit (moving means) 23 for moving the roller 21 along the sash 27 with the roller 21 pressing the weatherstrip 11 against the sash 27; the force sensor 32 disposed between the roller 21 and the moving unit 23 for detecting a reaction force R applied to the roller 21; and the control unit 22 for controlling the roller 21 on the basis of the reaction force R detected by the force sensor 32, such that a pressing force of the roller 21 to press the weatherstrip 11 is constant while the pressed surface 21a of the roller 21 has a peripheral speed either equal to a speed of the movement of the roller 21 or higher than the speed of the movement of the roller 21 by a maximum of 10% of the speed of the movement of the roller 21.

The roller 21 presses the weatherstrip 11 while rotating such that the peripheral speed V2 of the pressed surface 21a of the roller 21 is equal to the speed V1 or higher than the speed V1 by a maximum of 10% of the speed V1 when the roller reaches at least one part of the route. This rotation of the roller 21 prevents the weatherstrip 11 from slackening or stretching in the direction of movement of the roller 21 when the weatherstrip 11 is fitted in the sash 27. Additionally, the force sensor 32 detects the reaction force applied to the roller 21, such that the roller 21 presses the weatherstrip 11 with the constant pressing force to thereby fit the weatherstrip 11 uniformly in the sash 27. The weatherstrip 11 thus fitted in the sash 27 has a high quality, and need not repaired nor detached from and again mounted to the sash 27, which improves productivity of the vehicles.

In the illustrated embodiment, the roller 21 rotates such that the peripheral speed V2 of the pressed surface 21a of the roller 21 is equal to the speed V1 of the movement of the roller 21 along the sash 27 or higher than the speed V1 by the maximum of 10% of the speed V1. In another embodiment the force sensor 32 detects a force acting on the roller 21 in a direction along the sash 27 or a torque acting about the rotational shaft of the roller 21, and the peripheral speed V2 of the roller 21 is controlled on the basis of the detected force or torque to prevent slackening of the weatherstrip 11.

In still another embodiment, as the roller 21 presses the weatherstrip 11, the peripheral speed V2, after becoming higher than the speed V1 by the maximum of 10% of the speed V1, may decrease to a speed equal to the speed V1 if necessary.

INDUSTRIAL APPLICABILITY

The method and apparatus for mounting a soft member is suitable for mounting a weatherstrip on a vehicle door.

The invention claimed is:

1. A method for mounting a soft member on an elongated member using a roller by fitting the soft member into the elongated member, the elongated member having a substantially U-shaped cross-section, the soft member having an elongated configuration, the method comprising the steps of:
   temporarily attaching the soft member to the elongated member; and
   rotating the roller using a servomotor disposed between the roller and a force sensor, the force sensor detecting a reaction force applied to the roller and the servomotor having a rotational shaft to which the roller is directly and rotatably connected while moving the roller on a route provided along the elongated member with the roller pressing the soft member, such that a pressed surface of the roller pressed against the soft member has a peripheral speed either equal to a speed of the movement of the roller or higher than the speed of the movement of the roller by a maximum of 10% of the speed of the movement of the roller when the roller reaches at least one part of the route,
   wherein a pressing force of the roller exerted on the soft member is always constant as the roller presses the soft member.

2. An apparatus for mounting a soft member on an elongated member by fitting the soft member into the elongated member, the elongated member having a substantially U-shaped cross-section, the soft member having an elongated configuration, the apparatus comprising:
   a roller rotated by a servomotor;
   moving means for moving the roller along the elongated member with the roller pressing the soft member against the elongated member;
   a force sensor disposed between the roller and the moving means for detecting a reaction force applied to the roller, wherein the servomotor is disposed between the force sensor and the roller and detects a peripheral speed of a pressed surface of the roller pressed against the soft member, the servomotor having a rotational shaft to which the roller is directly and rotatably connected; and
   a control unit for controlling the roller on the basis of the reaction force detected by the force sensor and for controlling a speed of the servomotor, such that a pressing force of the roller which presses the soft member against the elongated member is constant while the peripheral speed of the pressed surface of the roller pressed against the soft member is either equal to a speed of the movement of the roller or higher than the speed of the movement of the roller by a maximum of 10% of the speed of the movement of the roller.

* * * * *